(12) United States Patent
Prendergast et al.

(10) Patent No.: US 12,511,657 B2
(45) Date of Patent: Dec. 30, 2025

(54) SYSTEMS AND METHODS FOR PROCESSING REAL-TIME TRANSFER INSTRUCTIONS

(71) Applicant: The Toronto-Dominion Bank, Toronto (CA)

(72) Inventors: Jonathan Joseph Prendergast, West Chester, PA (US); Thomas Osman Kelly, Wenonah, NJ (US); Claude Bernell Lawrence, Jr., Philadelphia, PA (US)

(73) Assignee: The Toronto-Dominion Bank, Toronto (CA)

( * ) Notice: Subject to any disclaimer, the term of this patent is extended or adjusted under 35 U.S.C. 154(b) by 170 days.

(21) Appl. No.: 17/475,648

(22) Filed: Sep. 15, 2021

(65) Prior Publication Data
US 2023/0080249 A1 Mar. 16, 2023

(51) Int. Cl.
*G06Q 20/40* (2012.01)
*G06Q 20/28* (2012.01)
*G06Q 20/38* (2012.01)

(52) U.S. Cl.
CPC ......... *G06Q 20/4037* (2013.01); *G06Q 20/28* (2013.01); *G06Q 20/389* (2013.01); *G06Q 20/401* (2013.01); *G06Q 20/405* (2013.01)

(58) Field of Classification Search
CPC ............... G06Q 20/4037; G06Q 20/28; G06Q 20/389; G06Q 20/401; G06Q 20/405
USPC .......................................................... 705/75
See application file for complete search history.

(56) References Cited

U.S. PATENT DOCUMENTS

| | | |
|---|---|---|
| 8,015,085 B2 | 9/2011 | Blagg et al. |
| 8,234,215 B2 | 7/2012 | Keiser et al. |
| 8,732,073 B2 | 5/2014 | Thomas |
| 8,751,338 B2 | 6/2014 | Dombroski et al. |
| 8,799,164 B2 | 8/2014 | Reardon |
| 8,818,887 B2 | 8/2014 | Ahlers et al. |
| 9,202,250 B1 | 12/2015 | Palaniappan |
| 10,318,956 B2 | 6/2019 | Shah et al. |

(Continued)

OTHER PUBLICATIONS

Zayzoon: "Financial Wellness That Works", http://www.zayzoon.com, retrieved on Jun. 16, 2021.

(Continued)

*Primary Examiner* — Courtney P Jones
(74) *Attorney, Agent, or Firm* — Rowand LLP (57) ABSTRACT

A computer-implemented method is disclosed. The method includes receiving, from a remote system, a transfer instruction regarding a user account that, if implemented, would result in a resource threshold event in the user account. The system hosting the user account then sends a query message to an external resource system regarding a resource account associated with the user account and receives a response indicating the resource availability level of the resource account. If the resource availability level is sufficient to avoid the resource threshold event, then the system causes the external resource system to re-allocate a quantity of resource from the resource account to the user account and it authorizes and implements the transfer instruction. The external resource system may be a payroll system or an earned wages access system, in some cases, for obtaining early access to earned wages prior to payroll processing.

20 Claims, 5 Drawing Sheets

(56) References Cited

U.S. PATENT DOCUMENTS

| | | | |
|---|---|---|---|
| 10,572,862 B2 | 2/2020 | Robinson et al. | |
| 11,023,873 B1* | 6/2021 | Grassadonia | G06Q 40/03 |
| 11,257,169 B2* | 2/2022 | Zubenko | G06Q 40/125 |
| 2006/0059085 A1 | 3/2006 | Tucker | |
| 2007/0168274 A1 | 7/2007 | Taylor | |
| 2009/0119673 A1* | 5/2009 | Bubba | G06F 9/50 |
| | | | 713/300 |
| 2015/0379644 A1 | 12/2015 | Danielak et al. | |
| 2016/0012465 A1* | 1/2016 | Sharp | G06Q 20/321 |
| | | | 705/14.17 |
| 2016/0371661 A1* | 12/2016 | Shah | G06Q 40/03 |
| 2018/0060843 A1* | 3/2018 | Maheshwari | G06Q 50/01 |
| 2019/0251564 A1* | 8/2019 | Shah | G06Q 20/4015 |
| 2020/0027087 A1* | 1/2020 | Venkatasubramanian | |
| | | | G06Q 20/4037 |
| 2020/0380481 A1 | 12/2020 | Kalaboukis | |
| 2022/0029928 A1* | 1/2022 | Tatti | H04L 47/745 |
| 2023/0049749 A1* | 2/2023 | MacInnis | G06Q 40/00 |
| 2023/0120999 A1* | 4/2023 | Neustifter | G06Q 20/145 |
| | | | 705/39 |

OTHER PUBLICATIONS

Livingston: "15 Best Paycheck Advance Apps to Help You Make it to Payday", published in Money Crashers, http://www.moneycrashers.com/paycheck-advance-apps-payday/, publication date Apr. 22, 2021.

Porter: "Dave Checking Account Review: Focused on Easy Money Access", published in My Bank Tracker, https://www.mybanktracker.com/checking/reviews/dave-checking-account-307490, publication date May 18, 2021.

Payactiv: "Earned Wage Access—The Employee Benefit With the Most Impact", http://www.payactiv.com/earned-wage-access/, retrieved on Jun. 16, 2021.

* cited by examiner

SYSTEMS AND METHODS FOR PROCESSING REAL-TIME TRANSFER INSTRUCTIONS

TECHNICAL FIELD

The present application relates to computer handling of transfer instructions associated with a user account and, more particularly, to systems and methods for securely processing real-time transfer instructions that would result in a resource threshold event regarding the user account.

BACKGROUND

In a computer network, resources may be shared or transferred between nodes of the network. For example, computing resources, such as processing units, memory, etc., may be transferred between nodes in order to attain a desired distribution of resources for a computer network. As another example, electronic transfers of data between data records may effect changes to the quantum of resources associated with the data records.

Requests for transfer of resources may be directed to a computing system that processes and handles such requests. Instructions may be received by the computing system to remove or transfer resource from a user account such that the resulting quantity of resources associated with the user accounts falls below a threshold level, i.e. produces a resource threshold event. In some cases, resources may be available in an external account on an external system, such as an earned wages access service, to offset this shortfall.

A user could anticipate potential resource threshold events, e.g. defaults or overdrafts, and make anticipatory requests for early access to external resources before any default occurs; however, this imposes a time and energy cost of constant monitoring of both the user's accounts and any external resource accounts and anticipating future resource usage events. Overly aggressive use of an early resource access system may result in additional costs for the early resource access that more than undermine any mitigation of costs or penalties for the user account. Moreover, there is a non-zero computing energy and bandwidth cost associated with user login and monitoring of account levels and consequent generation of transfer instructions relating to the accounts and external resource accounts.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

In an aspect, the present disclosure describes a computing system for handling a transfer event. The computing system may include a processor; a communications module coupled to the processor; and a memory coupled to the processor. The memory may store processor-executable instructions that, when executed by the processor, cause the processor to receive a transfer instruction regarding a user account, including a transfer quantity; determine from the transfer quantity and resources associated with the user account that the transfer instruction would result in a resource threshold event associated with the user account; transmit a query message to an external resource system using a user identifier associated with the user account; receive a response message from the external resource system providing a resource availability level of a resource account associated with the user identifier; and based on the resource availability level being sufficient to avoid the resource threshold event, send a transfer request to the external resource system to re-allocate a first quantity of resources from the resource account to the user account, and authorize and implement the transfer instruction.

In some implementations, the transfer instruction is received from a real-time transfer rail system.

In some implementations, the resource threshold event is a negative balance in the user account.

In some implementations, the resource threshold event is a credit used level exceeding a maximum credit level.

In some implementations, the instructions, when executed, are to cause the processor to determine that the transfer instruction would result in the resource threshold event based on the resources associated with the user account, deduction of the transfer quantity from the resources, and one or more scheduled events associated with the user account over a time window.

In some implementations, the instructions, when executed, cause the processor to send the transfer request to the external resource system by determining a resource shortfall that would result from the transfer instruction and determining that the resource availability level exceeds the resource shortfall, and wherein the first quantity is the resource shortfall.

In some implementations, the instructions, when executed, further cause the processor to determine that the user account includes a pre-authorization to move resources from the resource account prior to sending the transfer request.

In some implementations, the instructions, when executed, further cause the processor to determine that authorization is required to access the resource account; transmit an authorization query message to a user address associated with the user account; receive, in reply to the authorization query message, an authorization approval response; and send the transfer request based on receipt of the authorization approval response. In some cases, the user address is one of a telephone number, an email address, an application installation identifier, or a social media handle.

In some implementations, the instructions, when executed, are to cause the processor to authorize and implement the transfer instruction in response to determining that the resource availability is sufficient to avoid the resource threshold event by sending a transfer approval message to an external computing system that sent the transfer instruction; and recording the transfer event in memory in association with the user account.

In some implementations, the external resource system includes one of a corporate payroll computing system, a third party payroll processing system, or an earned wage access service.

In another aspect, the present application describes a computer-implemented method for handling a transfer event. The method may include receiving a transfer instruction regarding a user account, including a transfer quantity; determining from the transfer quantity and resources associated with the user account that the transfer instruction would result in a resource threshold event associated with the user account; transmitting a query message to an external resource system using a user identifier associated with the user account; receiving a response message from the external resource system providing a resource availability level of a resource account associated with the user identifier; and based on the resource availability level being sufficient to avoid the resource threshold event, sending a transfer request to the external resource system to re-allocate a first quantity of resources from the resource account to the user account, and authorizing and implementing the transfer instruction.

Other aspects and features of the present application will be understood by those of ordinary skill in the art from a review of the following description of examples in conjunction with the accompanying figures. Example embodiments of the present application are not limited to any particular operating system, system architecture, mobile device architecture, server architecture, or computer programming language.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

The present application makes reference to a "transfer message" or a "transfer event" or a "transfer instruction". These terms refer a computer-readable message configured for transmission over one or more computer networks between computing systems or devices. The transfer message or instruction may be a structured message having a defined schema or set of predefined fields to contain data in some cases. The transfer message or instruction may be used to instruct a recipient system to transfer resources relating to a user account or data record. In some cases, the transfer instruction may relate to a payment or other transaction involving the user account or data record by which the quantity of resources associated with the user account or data record is to be decreased by the transfer quantity. The resources may be currency, physical assets, credits, tokenized items like non-fungible tokens, computing resources such as memory allocated or processor time, access rights, or any other resource that may be owned or credited to an account associated with an account holder. In many of the examples below, monetary resources may be referenced to illustrate concepts, but the present application is not necessarily solely applicable to financial or monetary instruments or resources.

In the present application, the terms "transferor" and "transferee" may be used interchangeably with "sender" and "recipient", respectively, in the context of describing transfers of resources. In some cases, the terms "payor" or "payee" may be used in the example of monetary resources.

As noted above, a transfer instruction may, when applied to a user account, result in a resource threshold event. This may include a less than zero quantity of resources associated with the user account or a less than a minimum threshold quantity of resources associated with the user account. The resource threshold event may result in failed transactions, denied services, and/or additional costs or penalties.

User accounts may receive regularly scheduled replenishments; for instance, a mobile connectivity account may have a monthly data allocation, a computing resources account may have a monthly server time allocation, or a bank account may have a regular income deposit (e.g. payroll payment). In some cases, external systems may exist to enable a user or administrator to receive an early allocation of resources before the scheduled replenishment, i.e. an "advance" of resources. For example, in the case of payroll, some services exist that, in concert with a payroll system, make wages available earlier than the regular payroll processing schedule. That is, an employee may request early access to earned wages. One example of such a system is DailyPay™ of New York, US. There may be a cost or surcharge for early access to resources in some cases.

The ex post facto correction of a shortfall in resources may still result in denied services, failed transactions, or penalties. The alternative is proactive user anticipation of a future shortfall, which cannot always reasonably or reliably occur. Moreover, to avoid the cost of unnecessary early access to resources, a user is required to constantly monitor user account status and potential or imminent transfer instructions relating to the user account. This may involve more active user logins and monitoring of account status and available resource status on both the computing system and the external resource system to proactively manage potential shortfalls and make anticipatory requests for early access. This is potentially wasteful of both user time and energy and of the processing power, bandwidth usage, and memory footprint of the computing system, the user's client devices, and/or the external resource system.

Accordingly, the present application provides for methods and systems integrated into transfer processing that determine whether a resource threshold event will occur in a user account as a result of a received transfer instruction. If an external resource account permits early access to an allocation of resources, the system may proactively and automatically request a re-allocation of at least some resources to the user account to prevent occurrence of the resource threshold event. The system may then authorize and/or implement the transfer instruction without causing the resource threshold event. Since the computing system is configured to process the transfer instruction in real-time and because it has immediate access to data regarding the user account, including external resource availability, the system is able to take real-time proactive action to reallocate resources to the user account from the external resource account to prevent the resource threshold event. This removes the likelihood of inadvertent or avoidable resource threshold events and prevents the waste of user and system time inherent in having the user constantly monitor the account level in order to take anticipatory action to move resources before any transfer instructions are generated that would cause a resource threshold event. The real-time assessment and implementation of resource threshold event detection and proactive access to resources from the external resource system in the course of real-time processing or handling of the transfer instructions produces an improved transfer processing system that minimizes resource threshold events in a computing-efficient manner.

Figure 1:
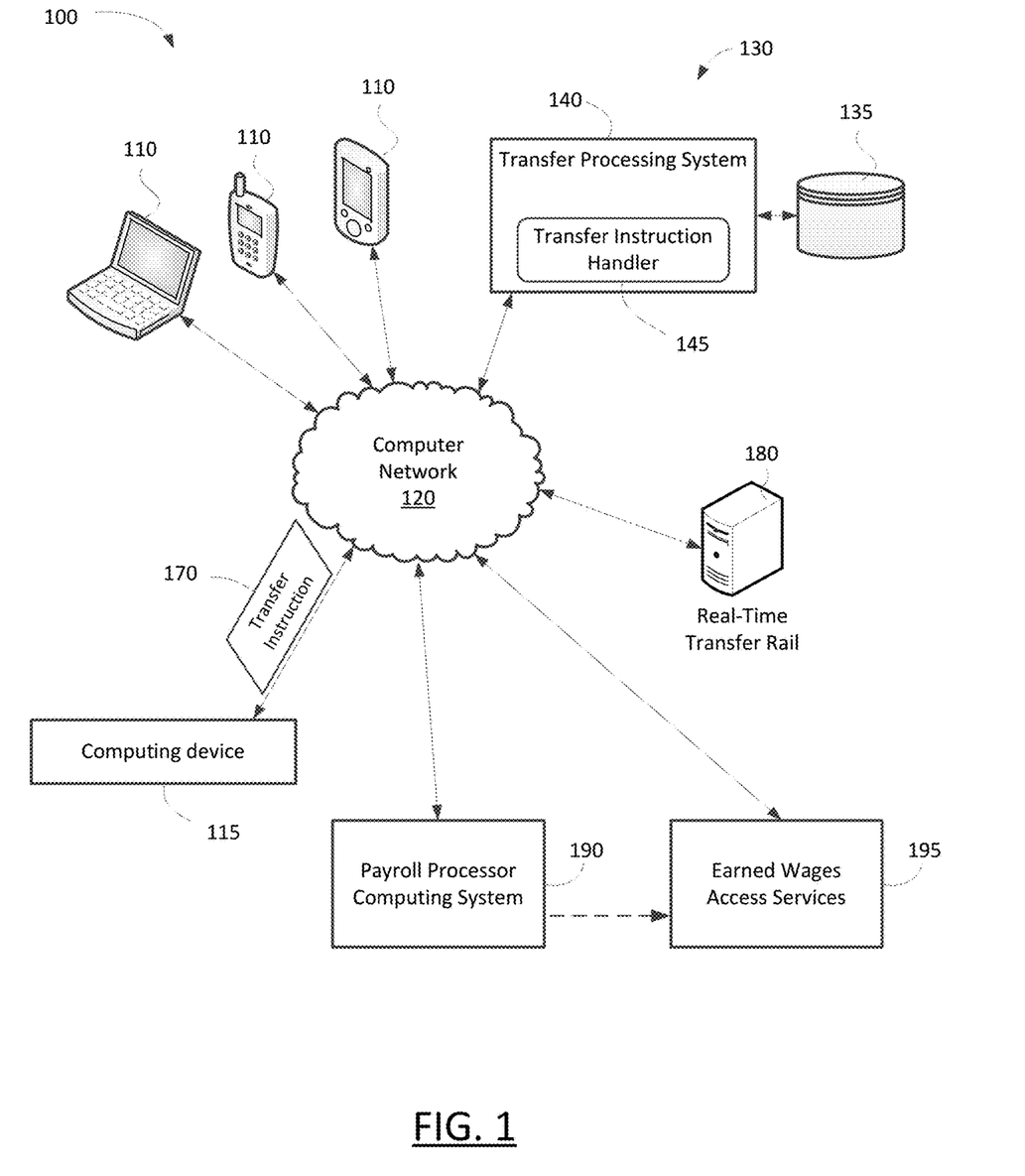
FIG. 1 is a schematic diagram illustrating an operating environment of an example embodiment.

FIG. 1 is a schematic diagram illustrating an operating environment of an example embodiment. In particular, FIG. 1 illustrates exemplary components of a system 100 for processing transfers of resources between computing systems. As a specific example, the system 100 may be implemented to facilitate processing and handling of requests to transfer resources (e.g., transfer instructions) between resource accounts (or data records associated therewith). More generally, the components of system 100 enable processing of resource transfer requests that are directed to a resource account management system.

As illustrated, a computing system 130 and one or more client devices 110 communicate via a computer network 120. The network 120 is a computer network. In some embodiments, the network 120 may be an internetwork such as may be formed of one or more interconnected computer networks. For example, the network 120 may be or may include an Ethernet network, an asynchronous transfer mode (ATM) network, a wireless network, or the like.

The client devices 110 are network-capable computing devices. For example, the client device 110 may include various computing devices, including desktop computers, laptop computers, mobile devices, smartphones, tablets, etc. One or more client devices 110 may be configured to access the computing system 130 or another resource storage or accounting system using a dedicated application and/or a web browser. One or more of the client devices 110 may be associated with an account holder that has one or more accounts defined within the computing system 130. The accounts may be associated with account holder log in and authentication data for authenticating requests for access or commands or operations in relation to the accounts.

The computing system 130 may track, manage, and maintain resources for a plurality of users in association with respective defined accounts. The resources may, for example, include computing resources, such as memory or processor cycles, bandwidth, data or memory usage, etc. By way of further example, the resources may include stored value, such as fiat currency, which may be represented in one or more databases. For example, as shown in FIG. 1, the computing system 130 may include a database 135, which may be provided in secure storage. In some embodiments, the secure storage may include one or more data centers. The data centers may, for example, store data with bank-grade security.

The computing system 130 may include a transfer processing system 140 configured to receive and authenticate transfer instructions and to execute operations to give effect to transfer instructions. The transfer processing system 140 may include a transfer instruction handler 145 implemented to automatically process resource transfer instructions that are received by the transfer processing system 140. Specifically, the transfer instruction handler 145 may be configured to process requests to transfer resources that are associated with one or more resource accounts managed by the computing system 130. In the normal course, the transfer instruction handler 145 may receive, for example, a payment instruction directing payment of a transaction from funds in a user account on the computing system 130. The transfer instruction handler 145 may verify or authenticate the instruction as a legitimate instruction, identify the associated user account, confirm sufficient funds exist associated with the user account, debit the user account by the transfer quantity, and carry out operations to transfer the transfer quantity to the payee of the payment instruction. Various inter-bank or third-party communications may be involved in processing such a payment, which may take the form of a direct withdrawal, debit transaction, email money transfer, or any other form of such a transaction. If insufficient funds are present in association with the user account, then the transfer instruction handler 145 may be configured to refuse or decline the transfer instructions or, if the user account is configured to permit a negative balance or overdraft state, then it may carry out the transfer instruction and record the negative balance of resources in association with the user account.

The transfer instruction handler 145 may be implemented by one or more modules or applications containing processor-executable instructions stored in memory in the transfer processing system 140 and configured to cause one or more processors to carry out operations described herein, once executed by the one or more processors. The present application is not intended to be limited to any specific computing system architecture, operating system, or programming language.

The computing system 130 may, for example, be one or more financial institution servers and the entity associated with one of the client devices 110 may be a customer of a financial institution operating the one or more financial institution servers.

As shown in FIG. 1, the system 100 may include a real-time transfer rail 180. In at least some embodiments, the real-time transfer rail 180 may be a payment rail. For example, the real-time transfer rail 180 may be hosted by a real-time payment system that includes a real-time payment server. The real-time payment system may be associated with a third-party and be configured to receive a resource (e.g., data) transfer request. The resource transfer request may include a request to transfer resources from a first data record to a second data record. The first data record may include a data record associated with a user account on the computing system 130 and the second data record may include a data record associated with a recipient stored on another computing system or on the computing system 130. For example, the first data record may be associated with a payor account in a first financial institution database and the second data record may be associated with a payee account in a second financial institution database.

The request to transfer resources may be a request to transfer data such as, for example, units of value. The units of value may include a quantity of currency. The transferee or transferor may initiate the resource transfer request using, for example, a computing device. In some cases, the request may originate via a point-of-sale device.

Responsive to receiving a resource transfer request, a real-time payment system may complete the resource transfer request using the real-time transfer rail 180. Specifically, a real-time payment server may be configured to receive the resource transfer request and to facilitate the resource transfer from the first data record associated with the transferor to the second data record associated with the transferee in real-time. In some embodiments, the resource transfer may be irrevocable; that is, the transferor may not be able to retrieve the transferred resources after the transfer. In some cases, the real-time payment rail 180 communicates with the computing system hosting the first data record to confirm that sufficient resources are stored in association with the first data record before completing processing of the real-time resource transfer request.

The real-time transfer rail 180 may be configured to complete resource transfer requests in real-time or substantially in real-time. In at least some embodiments, real-time is defined as being within seconds. Certain factors, such as network traffic, may limit the immediacy of real-time transfers and/or processing of transfer requests.

In some implementations, the real-time transfer rail 180 is a third-party transfer rail that operates between respective financial institutions. That is, a transfer instruction may be sent from one computing system or a point-of-sale terminal to the real-time transfer rail 180 where it is authenticated and processed in real-time to generate a payment confirmation in response. The real-time processing may include exchanging real-time data with a payor computing system confirming authentication of the transfer instruction and availability of the resources being transferred. The real-time processing may further include sending communications to the payee computing system specified in the transfer instructions. The communications may include a further transfer instruction, which may or may not be in the same structure or format as the original transfer instruction, instructing allocation of the transferred resources to a specified account at the payee computing system. In some other implementations, the real-time transfer rail 180 may be a part of the payee or payor computing system.

A computing device 115, such as a point-of-sale terminal or similar payment processing device, may generate, or to cause a resource management computing system to generate, a transfer instruction 170 that is sent via the computer network 120, and in some cases the real-time transfer rail 180, to the computing system 130. The transfer instruction 170 may include an identifier of an account and/or an account holder at the computing system 130 and a transfer quantity. The transfer quantity may be a quantity of resources to be transferred from the account. The resources may include monetary resources or non-monetary resources. The computing device 115 may include a computing system, a computing device, or one of the client devices 110. In some cases, the computing device 115 may be a financial institution computing system or server.

The system 100 may further include an external resource system. The external resource system may be configured to periodically transfer resources to the user account within the computing system 130. The periodic transfer of resources may be occur weekly, bi-weekly, monthly, or on some other schedule in some implementations. That is, the resources in the user account may be replenished or supplemented from the external resource system in somewhat regular intervals. As an example, in the case of a mobile communications account with fixed data usage caps and extra fees for overages, the resources may include data usage and the replenishment may be re-setting of the data usage meter each billing cycle, which equates to allocating the full data usage cap to the account each billing cycle. In another example, the user account may include a bank account and the external resource system may include a payroll system that automatically deposits wages to the bank account in accordance with a payroll schedule. The payroll schedule may be weekly, bi-weekly, monthly, or on some other frequency. The quantity of funds deposited may be fixed in the case of a salaried employee, but subject to various deductions or bonuses or other credits or debits administered by the payroll system. In the case of an hourly employee, the wages may vary from pay period to pay period dependent on the number and type of hours recorded in the payroll system for an employee associated with the user account.

In FIG. 1, the system 100 includes a payroll processor computing system 190. The payroll processor computing system 190 may be a corporate computing system associated with an employer or may include a computing system operated by a third-party payroll processing company. The payroll processor computing system 190 may be configured to transfer funds to the user account in accordance with the payroll data and schedule configured on the payroll processor computing system 190.

In many instances, resources such as data caps, bandwidth, computing resources, payroll funds, etc., are only made available to a user account after the resources have been earned. In many cases, there may be a delay in transferring the resources to the user account after it has been earned. For example, an employee typically works hours for one or two weeks before a payroll is processed to deposit wages associated with the hours worked in the preceding one or two weeks.

In order to facilitate earlier access to earned resources, some services have developed to provide users with early access to such resources prior to the scheduled resource transfer time. For instance, there are earned wages access services 195 that provide employees with access to some or all of their accrued earned wages in advance of a payday. In some cases, this service is provided directly by an employer. In some cases, the service may be provided by a third-party system or application that is approved for use by the employer and/or the payroll processing company. The earned wages access service 195 may charge users a fee, either a flat fee or a percentage, for advancing funds prior to payroll processing time.

The earned wages access services 195 may be enabled by an employer and an employee may choose to access the service through an application or web interface in order to submit a request for early access to available wages. The wages may then be advanced through transfer to the associated bank account of the user. When the payroll is eventually processed on its normal schedule, the advanced wages and any fees are deducted from the amount sent to the user's bank account.

This system may provide a user with early access to resources that would otherwise arrive later. This may permit a user to cure a default or negative position in a resource account. For instance, early access to the next month's data cap for mobile data usage may address a problem with data overage charges continuing to accrue if a user has reached the data cap for the current billing cycle. However, curing a default necessarily means that costs or penalties have already occurred. For instance, a bank account may already be in an overdraft position before the user obtains early access to wages to cure the default.

A "default" of this nature may be referred to herein as a "resource threshold event". In many cases, the threshold may be zero, i.e. using up all the resources associated with the account such that the allocated resources in the account reach zero or negative. In some cases, a non-zero threshold may be established. For instance, a bank account may have a threshold balance below which additional fees become payable. If the balance remains above that threshold, then all fees may be waived, but if the balance falls below the threshold then fees may become payable for that month or billing cycle. Other costs or penalties may be occurred as a result of a resource threshold event.

A user could anticipate potential resource threshold events, e.g. defaults, and make anticipatory requests for early access to resources before any default occurs; however, this imposes a time and energy cost of constant monitoring of both the user's accounts and any external resource accounts and anticipating future resource usage events. Overly aggressive use of an early resource access system may result in additional costs for the early resource access that end up being more damaging than the costs or penalties associated with the resource threshold event. Moreover, there is a computing energy and bandwidth cost associated with user login and monitoring of account levels and consequent generation of transfer instructions relating to the accounts and external resource accounts.

Accordingly, the present application provides for the transfer instruction handler 145 to identify, when a transfer instruction is received, whether the implementation of the transfer instruction will result in a resource threshold event for the associated user account. If so, and if an external resource system is associated with the user account, then the transfer instruction handler 145 may query whether sufficient resources are available at the external resource system to prevent occurrence of the resource threshold event. If so, then it may request transfer or re-allocation of some portion of those resources to the user account and then authorize and implement the transfer instruction, thus preventing, in real-time, the resource threshold event. The transfer instruction handler 145 implements just-in-time access to advance resource allocations when a transfer instruction would otherwise cause a resource threshold event.

On receipt by the computing system 130 of the transfer instruction 170, the transfer instruction handler 145 may identify a user account specified in the transfer instruction 170. In some implementations, the transfer instruction 170 may include a token or other unique identifier that the transfer instruction handler 145 is able to map to the user account. The transfer instruction handler 145 may then verify or authenticate other data, such as a user identifier or other metadata, to ensure it matches with local records in the database 135 regarding the user account. It may also determine whether there are any resource threshold settings or parameters specified for the user account, such as a minimum quantity of resources required, penalties applicable to overdrawn or negative balance conditions, or other such threshold information.

The transfer instruction handler 145 may assess whether the transfer instruction 170, if implemented, would result in a resource threshold event based on the resource threshold settings, the quantity of resources associated with the user account, and the transfer quantity specified in the transfer instruction 170. In some cases, as will be described further below, the transfer instruction handler 145 may assess whether the resource threshold event is likely to occur in the near future due to one or more scheduled resource consumption or usage events planned for the user account prior to a scheduled or anticipated resource replenishment operation, even if the resource threshold event would not occur immediately upon implementation of the transfer instruction 170.

If a resource threshold event, or likely resource threshold event, is identified by the transfer instruction handler 145, then it may determine whether an external resource system is available. In this example, the external resource system may be the payroll processor computing system 190 or the earned wages access service 195. If authorized by settings stored in association with the user account, the transfer instruction handler 145 may send a query to the external resource system to determine whether sufficient external resources are available for early transfer to the user account so as to avoid the resource threshold event. It receives a response message specifying a quantity of available resources, if any. If sufficient resources are available from the external resource system, then the transfer instruction handler 145 may generate and send a transfer request to the external resource system for at least a quantity of the external resources sufficient to offset or forestall the resource threshold event. The external resource system may then transfer the requested quantity of resources to the user account using a prescribed or selected transfer protocol for reallocating resources from the external resource system to the user account on the computing system 130.

In some implementations, the transfer instruction handler 145 may determine whether to authorize or deny the transfer instruction 170. That is, the transfer instruction handler 145 may be configured to deny or decline the transfer instruction 170 if it would cause a resource threshold event and external resources are unavailable or insufficient to prevent the resource threshold event. In some cases, the transfer instruction handler 145 may be configured to authorize and implement the transfer instruction 170 irrespective of whether a resource threshold event will occur. In such cases, the user account may be permitted to enter a state of negative balance or below-threshold balance, and penalties or other costs may be incurred due to that state, but the transaction causing that state is nevertheless authorized and implemented.

In some implementations, if the transfer instruction handler 145 identifies that external resources are available to offset a potential resource threshold event, it may determine whether the user account has stored a pre-authorization to access such resources. That is, the account holder or user associated with the user account may be able to set account parameters to signal whether access to external resources is permitted or not. Various conditions may be configured in some cases, such as a maximum amount permitted to be obtained from the external resource system, or certain types or classes of transfer instructions or user accounts for which external resources may be accessed, and others for which the external resources may not be accessed. For instance, to use a monetary example, the settings may specify that early access to wages is permitted to prevent a user chequing account from going into overdraft, e.g. a negative balance, but is not permitted to prevent a line of credit account from exceeding a preset threshold. In another example, an account may have multiple thresholds, such as a bank account with an overdraft threshold of a zero balance, and a minimum balance threshold below which certain transaction or monthly fees are payable. The settings may permit access to early wages for preventing overdraft but not for preventing the balance from going below the minimum balance threshold. In another example, the type of transaction instruction may be specified as a condition on accessing external resources. For instance, early access to wages may be permitted for avoiding a resource threshold event in connection with a debit card point of sale transaction, but may not be authorized for avoiding a resource threshold event in connection with a credit card transaction that exceeds a card limit.

In some cases, the settings may indicate whether real-time authorization for access to the external resources must be obtained from the user. If so, then the computing system 130 may be configured to send a notification to one or more addresses associated with the user account to seek an authorization or denial response. The notification may be text message, email, social media message, or other such electronic notification. The notification may be actionable, in that on the receiving device, the notification displayed may include one or more selectable responses that, when selected, generate and send a reply message to the computing system 130. The reply message indicates whether authorization was granted by the user.

Figure 2A:
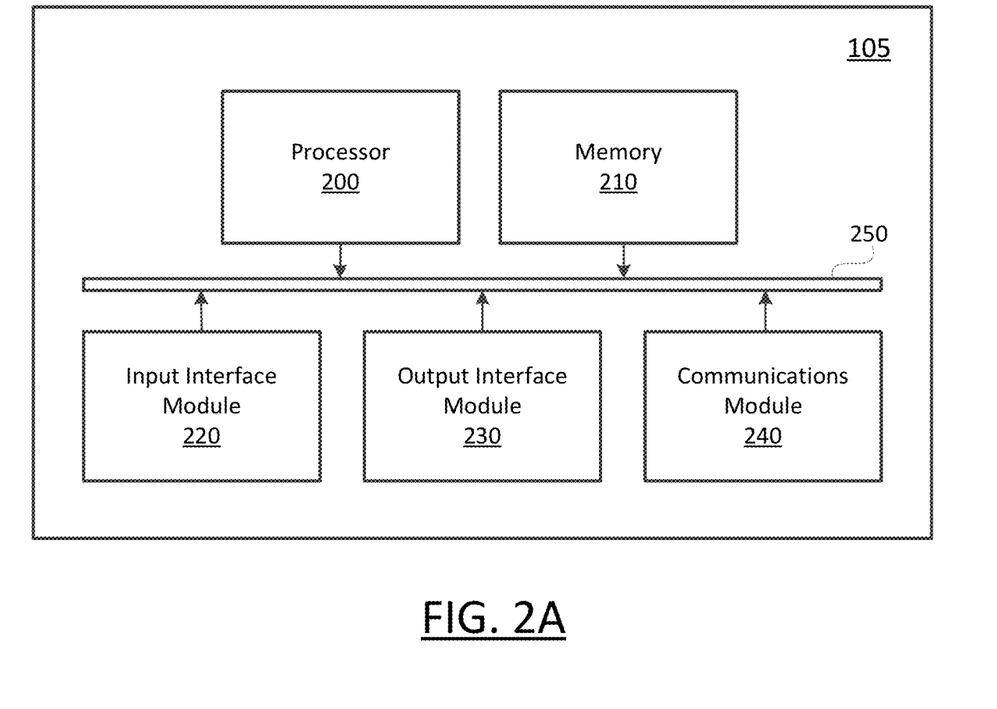
FIG. 2A is high-level schematic diagram of a computing device.

FIG. 2A is a high-level operation diagram of an example computing device 105. In at least some embodiments, the example computing device 105 may be exemplary of one or more of the computing system 130, the transfer processing system 140, the computing device 115, and/or one or more of the client devices 110. The example computing device 105 includes a variety of modules. For example, as illustrated, the example computing device 105, may include a processor 200, a memory 210, an input interface module 220, an output interface module 230, and a communications module 240. As illustrated, the foregoing example modules of the example computing device 105 are in communication over a bus 250.

The processor 200 is a hardware processor. Processor 200 may, for example, be one or more ARM, Intel x86, PowerPC processors or the like.

The memory 210 allows data to be stored and retrieved. The memory 210 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the example computing device 105.

The input interface module 220 allows the example computing device 105 to receive input signals. Input signals may, for example, correspond to input received from a user. The input interface module 220 may serve to interconnect the example computing device 105 with one or more input devices. Input signals may be received from input devices by the input interface module 220. Input devices may, for example, include one or more of a touchscreen input, keyboard, trackball or the like. In some embodiments, all or a portion of the input interface module 220 may be integrated with an input device. For example, the input interface module 220 may be integrated with one of the aforementioned example input devices.

The output interface module 230 allows the example computing device 105 to provide output signals. Some output signals may, for example allow provision of output to a user. The output interface module 230 may serve to interconnect the example computing device 105 with one or more output devices. Output signals may be sent to output devices by output interface module 230. Output devices may include, for example, a display screen such as, for example, a liquid crystal display (LCD), and/or a touchscreen display. Additionally, or alternatively, output devices may include devices other than screens such as, for example, a speaker, indicator lamps (such as for, example, light-emitting diodes (LEDs)), and printers. In some embodiments, all or a portion of the output interface module 230 may be integrated with an output device. For example, the output interface module 230 may be integrated with one of the aforementioned example output devices.

The communications module 240 allows the example computing device 105 to communicate with other electronic devices and/or various communications networks. For example, the communications module 240 may allow the example computing device 105 to send or receive communications signals. Communications signals may be sent or received according to one or more protocols or according to one or more standards. For example, the communications module 240 may allow the example computing device 105 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like.

Additionally, or alternatively, the communications module 240 may allow the example computing device 105 to communicate using near-field communication (NFC), via Wi-Fi™, using Bluetooth™ or via some combination of one or more networks or protocols. Contactless payments may be made using NFC. In some embodiments, all or a portion of the communications module 240 may be integrated into a component of the example computing device 105. For example, the communications module may be integrated into a communications chipset.

Software comprising instructions is executed by the processor 200 from a computer-readable medium. For example, software may be loaded into random-access memory from persistent storage of memory 210. Additionally, or alternatively, instructions may be executed by the processor 200 directly from read-only memory of memory 210.

Figure 2B:
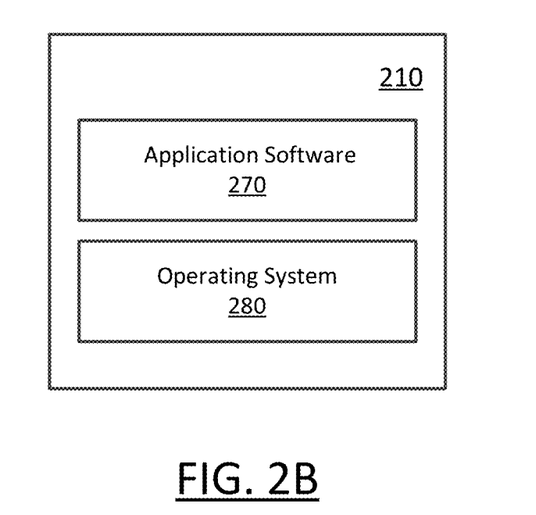
FIG. 2B shows a simplified organization of software components stored in a memory of the computing device of FIG. 2A.

FIG. 2B depicts a simplified organization of software components stored in memory 210 of the example computing device 105. As illustrated, these software components include application software 270 and an operating system 280.

The application software 270 adapts the example computing device 105, in combination with the operating system 280, to operate as a device performing a particular function. In some embodiments, the application software 270 may include the transfer instruction handler 145. In some examples, the application software 270 may include a transfer instruction application executed on the computing device 115. The transfer instruction application may, for example, be an embedded or secure application executing in the dedicated hardware of a point-of-sale device or one or more financial institution servers for generating and sending a debit or payment instruction with regard to the user account.

The operating system 280 is software. The operating system 280 allows the application software 270 to access the processor 200, the memory 210, the input interface module 220, the output interface module 230 and the communications module 240. The operating system 280 may be, for example, Apple iOS™, Google™ Android™, Linux™, Microsoft™ Windows™, or the like.

Figure 3:
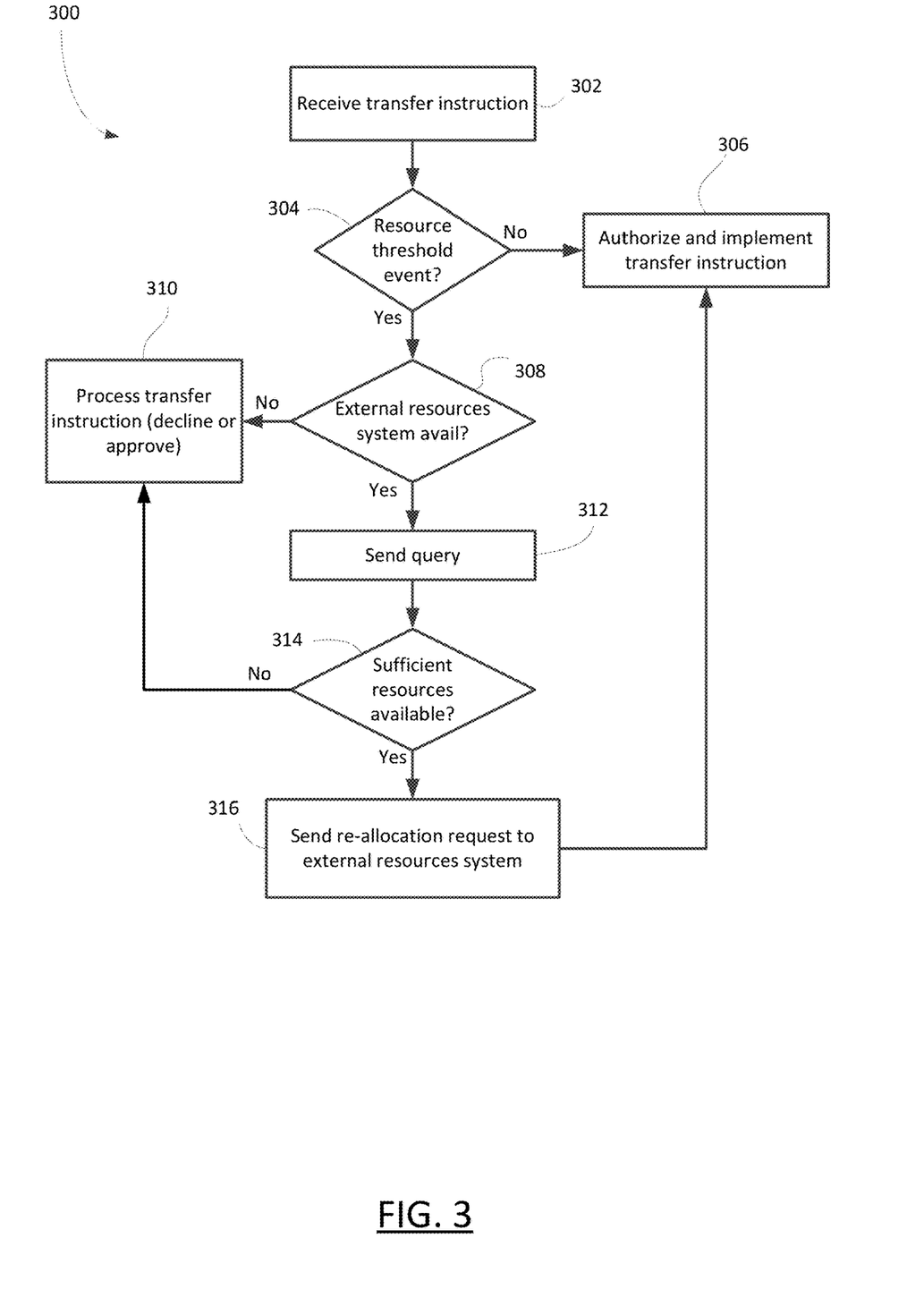
FIG. 3 shows, in flowchart form, an example method of processing a transfer instruction associated with a user account.

Reference is now made to FIG. 3, which shows, in flowchart form, an example method 300 of processing a transfer instruction. The method 300 may be implemented by a computing system such as the recipient computing system 130 of FIG. 1. Specifically, the transfer processing system 140 may be configured by software, such as the transfer instruction handler 145, to implement the method 300 as part of its processing of transfer messages. The method 300 may be performed by a computing system that manages one or both of a sender and a recipient account associated with a transfer message. The method 300 may be performed, for example, by the processor 200 (FIG. 2A) of a computing device 105 executing software comprising instructions such as may be stored in the memory 210 of the computing device 105. More particularly, processor-executable instructions may, when executed, configure a processor 200 of the recipient computing system 130 to perform all or parts of the method 300. In this example, the system receiving the transfer message is referred to as a transfer processing system.

The method 300 may be initiated through receipt by the computing system of a transfer instruction in operation 302. The transfer instruction may be received from a remote system or device, such as a client device, a third-party financial institution server, a payment processing server, a blockchain node, a real-time payment rail, or other such devices. The transfer instruction may be formatted in accordance with a prescribed or standardized schema, and various authentication and/or validation operations may occur to verify the legitimacy of the transfer instruction. Various communications may be exchanged with the remote system or other remote devices in the course of validating or authenticating the transfer instruction. The transfer instruction requests a transfer of a quantity of resources from a user and/or user account specified in the transfer instruction. If implemented, the transfer instruction would result in debiting the user account of the transferred quantity of resources. This may include updating a balance or other data record for the user account to reflect the removal of the quantity of resources. Various other operations may be implemented by the computing system to confirm transfer or allocation of those removed resources to an identified account at the remote system or on another system specified in the transfer instruction.

In operation 304, the computing system determines whether transfer of the resources would result in a resource threshold event with regard to the user account. As noted above, the user account may have one or more thresholds with respect to resources below which costs, penalties, or failed transfers may occur. One example threshold may be a zero balance, i.e. zero resources. If a transfer would result in a less than zero balance of resources in some cases the transfer may be refused or declined, or the transfer may be permitted placing the account into an "overdraft" state that results in penalties or costs. Another example threshold may be a minimum balance threshold. If a transfer would result in a non-zero positive balance below the minimum balance threshold, then the transfer may be permitted but may result in certain costs, fees, or penalties associated with the user account for failing to maintain the minimum balance of resources.

In some cases, as will be described in further detail below, the determination of whether a resource threshold event would occur may take into account future scheduled events with regard to the user account. An example may be future planned or scheduled debits and/or credits of resources with regard to the user account.

If no resource threshold event is identified in operation 304, then the transfer instruction is authorized and implemented in the normal course, as indicated by operation 306. This may include updating the data records associated with the user account to reflect removal of the transfer quantity of resources from the user account and generation and transmission of any communications prescribed for confirming and giving effect to the transfer of those resources to the identified recipient account.

If a resource threshold event is identified in operation 304, then the computing system determines whether the user account and/or the user profile has an associated external resources system in operation 308. That is, the user account, user profile, or other data record linked to the user account may have a stored record identifying one or more external resource systems. The record may indicate a user identifier or resource account on the external resource system. The external resource system may have an API or other defined interface for receiving communications relating to a user or resource account. For example, the external resource system may have a defined API for submitting a query regarding status or balance of a resource account, or a defined API for submitting a transfer request triggering a transfer of some quantity of resources from the resource account. As noted above, the external resource system may be an earned wages access service, in some implementations. The API or other communications interface may permit an external system, like the computing system, to submit a request to withdraw from the earned wages access service, provided that certain user credentials or other authorization data is submitted to validate the request.

If no external resource system is associated with the user or the user account, then in operation 310 the computing system processes the transfer instruction accordingly. In some implementations, this may mean authorizing and implementing the transfer instruction irrespective of whether it results in a resource threshold event with regard to the user account. In some cases, it may mean denying or declining the transfer instruction because it would result in a resource threshold event; for example, if the user account is not permitted to go into an overdraft state or some similar state.

If an external resource system is determined to be available in operation 308, then the computing system may send a query to the external resource system in operation 312. The query may be a prescribed message type or format. The query may utilize an API published by the external resource system for submitting queries. The query is transmitted to the external resource system over one or more wired or wireless computer networks. The external resource system may then validate the query, for example by confirming that user credentials or other authorization data in the query are valid and correctly identify a resource account associated with the user. If the query is valid, then the external resource system may prepare and send a response providing, at least, a balance or quantity of resources available for transfer from the resource account. In some cases, the available quantity may be zero. In the example of an earned wages access service, the available amount may depend on data received from a payroll system regarding earned wages or hours or days worked by the user since a last payroll run. The external resource system may have locally stored data based on an end-of-day report previously received from the payroll system in some cases. In some cases, the external resource system may be configured to make real-time queries of the payroll system to obtain real-time data regarding the status of users' earned wages or hours.

In operation 314, the computing system compares the data from the response message, and in particular the quantity of resources available from the resource account on the external resource system, with data regarding the resource threshold event and, in particular, the amount by which the balance or quantity of resources in the user account will fall below the threshold level. On this basis, the computing system determines in operation 314 whether there are sufficient resources available from the external resource account to offset or prevent the resource threshold event. If sufficient resources are available from the external resource system to prevent the resource threshold event, then in operation 316 the computing system generates and transmits a request for transfer of resources from the external resource system. The transferred resources, once confirmed by the external resource system may then be credited to the user account, thereby offsetting any shortfall that would otherwise cause the resource threshold event. If sufficient resource are not available, then in operation 310 the computing system processes the transfer instruction in the conventional manner, by either implementing it or declining it, depending on how it is configured to respond.

When sending a transfer request to the external resource system, the computing system may calculate a requested amount of resources in some cases. That is, the computing system may determine the amount by which the user account will fall below the threshold level and generate a transfer request for a quantity of resources in that amount or some fixed or percentage buffer quantity above that amount. In some instances, the computing system may request all available resources from the external resource system irrespective of the size of the potential shortfall.

Having generated and sent the transfer request, the computing system may also authorize and implement the transfer instruction in operation 306.

It will be appreciated that in some cases, depending on the timing of communications and authentications and delays in reconciliation, the transfer of a first quantity of resources from the external resource system to the user account may occur after implementation and authorization of the transfer instruction. That is, the user account may have a balance of resources below the threshold level for a period of time. In some cases, that time may be a few seconds, or minutes, or hours. In some cases, the transfer request from the external resource system may be recorded in association with the user account before finalization as a pending transaction, such that the recorded balance in memory on the computing system remains above the threshold level, but may be flagged as unconfirmed in the data record until the transfer from the external resource system is finalized. In many instances, costs, penalties, or other negative impacts of a resource threshold event may not occur instantaneously if the balance of the user account goes below the threshold level. In some cases, the balance is determined at a reconciliation time, such as at a certain point in the night when credits and debits are reconciled and applied to determine an end-of-day balance, and that end-of-day balance governs whether a resource threshold event occurred with respect to the user account. Accordingly, although there may be a delay in receiving resources from the external resource system that results in transient below-threshold resource levels in the user account, the balance may be returned to above-threshold levels prior to end-of-day, thereby avoiding penalties and costs.

Figure 4:
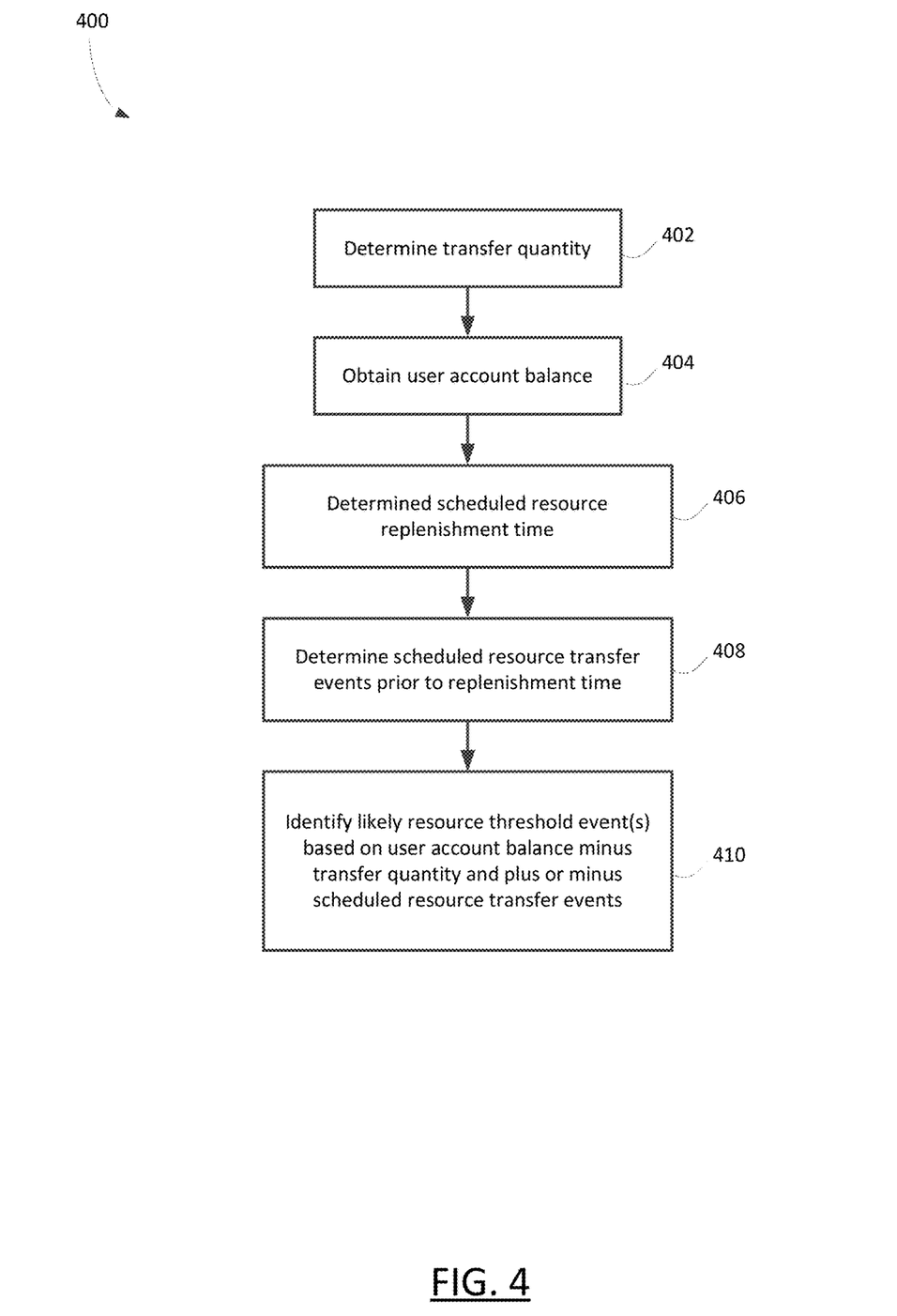
FIG. 4 shows, in flowchart form, an example method of identifying a likely resource threshold event.

Reference is now made to FIG. 4, which shows, in flowchart form, one example method 400 for identifying a potential resource threshold event. In some examples, this method 400 may be implemented as part of the identification of a resource threshold event in operation 304 (FIG. 3). The method 400 may be implemented in software on a computing system that processes transfer instructions, such as the transfer instruction handler 145 (FIG. 1).

The method 400 identifies likely resource threshold events. That is, the method 400 determines whether a transfer instruction will result in a resource threshold event immediately with regard to a user account, and/or whether the transfer instruction is likely to result in a resource threshold event within a certain time period in the future. The determination of whether a resource threshold event is likely in the future may be based on one or more scheduled debits or credits for the user account. The time period may be a set time, such as a few days, one week, two weeks, a month, etc., or may be a variable time period from a current time until a scheduled future event, such as a next payroll event, an end-of-billing-cycle date, or some other point at which the resources associated with the user account may be expected to be replenished or renewed in some quantity.

The method 400 includes determining the transfer quantity in operation 402, i.e. the quantity of resources that are to be removed from the user account as a result of the transfer instruction. The transfer quantity is typically specified in transfer instruction. In operation 404, data regarding the user account is retrieved from memory on the computing system. The data includes an account balance, i.e. the quantity of resource in or associated with the user account. The transfer instruction typically includes an identifier of the user account, such as an account number, token, public key, or other unique identifier for the user account.

In operation 406, the computing system determines the time period over which it will determine if a resource threshold event is likely. In some cases, this is a fixed time period, such as a few days, a week, two weeks, a month, etc. In some cases, this may include identifying a scheduled future resource replenishment date. For instance, to use a monetary example, a user account at a financial institution may receive a regularly scheduled credit, such as wages or another regular deposit of funds. In many cases, wages are received every two weeks on a "pay day", which may be identified as the future resource replenishment date. In another example, a mobile communications account may have a monthly data usage allocation that resets at the end of each billing cycle, in which case the end of the billing cycle may be identified as the resource replenishment date.

The scheduled resource replenishment date may be identified based on a setting or data stored in memory prescribing the schedule or frequency of resource replenishment. In some cases, the computing system may, in real-time or periodically, automatically determine the scheduled resource replenishment date based on a historical record of user account transactions. That is the computing system may identify a probable pattern of resource replenishment events in order to identify the replenishment frequency and schedule. The probable pattern may be identified based on pattern matching to within a prescribed confidence level. Other techniques may be used to mine historical user account data to identify a probable resource replenishment date.

In operation 408, the system may determine, from data retrieved from memory for instance, one or more scheduled events between the current time and the resource replenishment data that are expected to impact the resources associated with the user account. These may be regularly schedule events set by a user or identified by the computing system based on pattern identification for example. As an illustration, a user account may have one or more regularly scheduled resource debits, such as a regular bill payment deducted from the user account. Examples include monthly utility, mortgage, or other such payments that tend to be consistent in frequency and quantity. In some cases, the scheduled event may be a one-time future resource debit event pre-scheduled by the user or an administrator with regard to the user account. To use a financial example, the user may configure a future bill payment or other outgoing transfer of funds to be withdrawn from the user account on a defined date. In some cases, one or more of the scheduled events maybe credits of resources to the user account instead of debits.

In addition to identifying one or more scheduled events impacting the user account, the computing system determines the quantity of resources or likely quantity of resources associated with each of those events. It then, in operation 410 determines whether the current transfer instruction will result in a resource threshold event at any point from the current time to the resource replenishment date, taking into account the one or more scheduled events with regard to the user account.

Operation 410 may, in some examples, include starting with a number set at the current balance of resources associated with the user account and then applying the transfer instruction by subtracting the transfer quantity from the number and, in turn, applying each of the one or more scheduled events as a debit and/or credit to the number. The scheduled events may be applied in order of their scheduled occurrence, up to the resource replenishment date. After the application of each event to update the number, the computing system determines whether the number at any point falls below the resource threshold that represents a resource threshold event with regard to the user account. If as a result of the transfer quantity and/or one of the scheduled events the number is likely to fall below the resource threshold in the future due to the combination of the transfer instruction and the scheduled events, then the computing system has identified a likely resource threshold event with regard to the user account.

Figure 5:
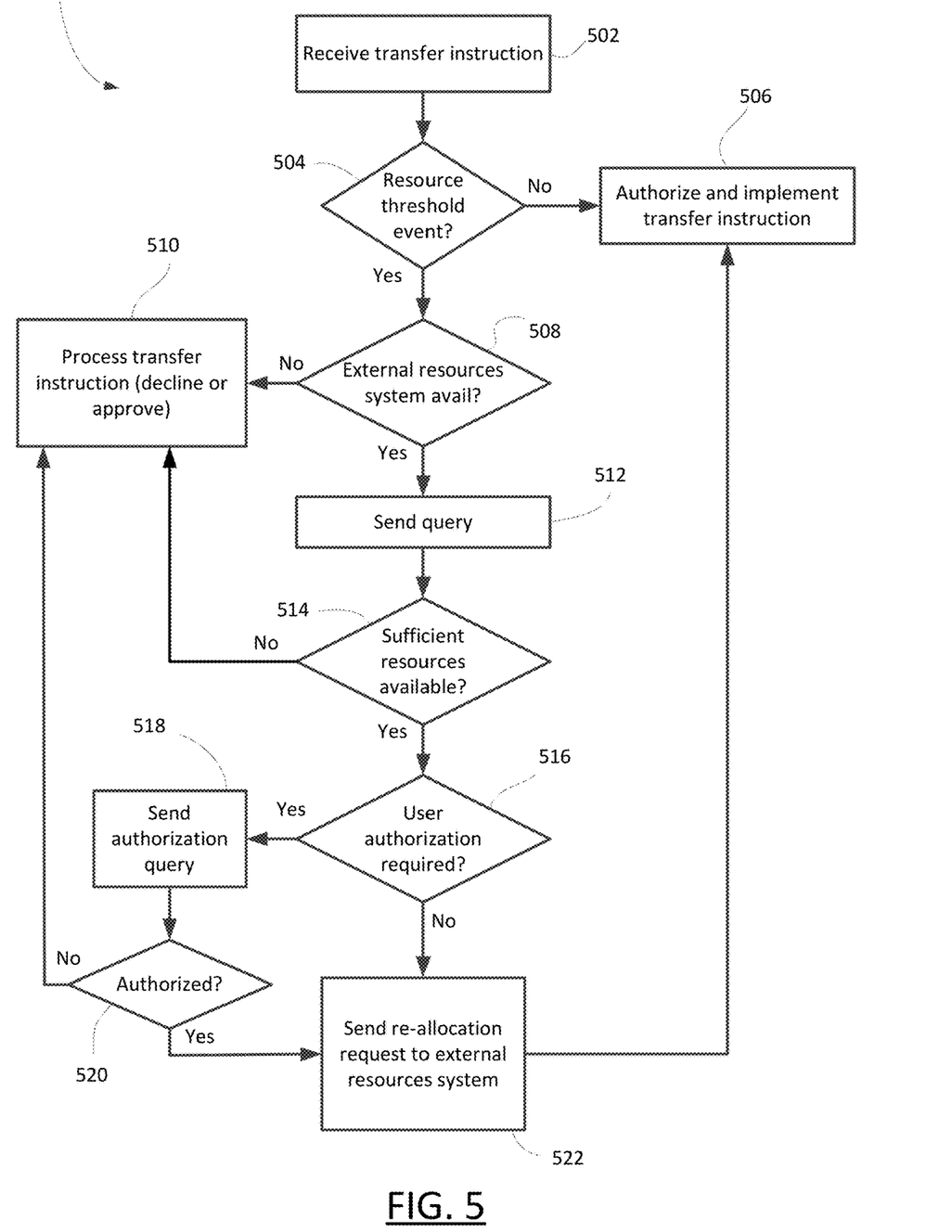
FIG. 5 shows, in flowchart form, another example method of processing a transfer instruction.

Reference will now be made to FIG. 5, which shows, in flowchart form, a further example method 500 of processing a transfer message. The method 500 may be implemented by a computing system such as the recipient computing system 130 of FIG. 1. Specifically, the transfer processing system 140 may be configured by software, such as the transfer instruction handler 145, to implement the method 500 as part of its processing of transfer messages.

The method 500 may be initiated through receipt by the computing system of a transfer instruction in operation 502. The transfer instruction may be received from a remote system or device, such as a client device, a third-party financial institution server, a payment processing server, a blockchain node, a real-time payment rail, or other such devices. The transfer instruction may be formatted in accordance with a prescribed or standardized schema, and various authentication and/or validation operations may occur to verify the legitimacy of the transfer instruction. Various communications may be exchanged with the remote system or other remote devices in the course of validating or authenticating the transfer instruction. The transfer instruction requests a transfer of a quantity of resources from a user and/or user account specified in the transfer instruction. If implemented, the transfer instruction would result in debiting the user account of the transfer quantity of resources. This may include updating a balance or other data record for the user account to reflect the removal of the quantity of resources. Various other operations may be implemented by the computing system to confirm transfer or allocation of those removed resources to an identified account at the remote system or on another system specified in the transfer instruction.

In operation 504, the computing system determines whether transfer of the resources would result in a resource threshold event with regard to the user account. As noted above, the user account may have one or more thresholds with respect to resources below which costs, penalties, or failed transfers may occur. One example threshold may be a zero balance, i.e. zero resources. If a transfer would result in a less than zero balance of resources in some cases the transfer may be refused or declined, or the transfer may be permitted placing the account into an "overdraft" state that results in penalties or costs. Another example threshold may be a minimum balance threshold. If a transfer would result in a non-zero positive balance below the minimum balance threshold, then the transfer may be permitted but may result in certain costs, fees, or penalties associated with the user account for failing to maintain the minimum balance of resources.

In some cases, as will be described in connection with FIG. 4, the determination of whether a resource threshold event would occur may take into account future scheduled events with regard to the user account. An example may be future planned or scheduled debits and/or credits of resources with regard to the user account.

If no resource threshold event is identified in operation 504, then the transfer instruction is authorized and implemented in the normal course, as indicated by operation 506. This may include updating the data records associated with the user account to reflect removal of the transfer quantity of resources from the user account and generation and transmission of any communications prescribed for confirming and giving effect to the transfer of those resources to the identified recipient account.

If a resource threshold event is identified in operation 504, then the computing system determines whether the user account and/or the user profile has an associated external resources system in operation 508. That is, the user account, user profile, or other data record linked to the user account may have a stored record identifying one or more external resource systems. The record may indicate a user identifier or resource account on the external resource system. The external resource system may have an API or other defined interface for receiving communications relating to a user or resource account. For example, the external resource system may have a defined API for submitting a query regarding status or balance of a resource account, or a defined API for submitting a transfer request triggering a transfer of some quantity of resources from the resource account. As noted above, the external resource system may be an earned wages access service, in some implementations. The API or other communications interface may permit an external system, like the computing system, to submit a request to withdraw from the earned wages access service, provided that certain user credentials or other authorization data is submitted to validate the request.

If no external resource system is associated with the user or the user account, then in operation 510 the computing system processes the transfer instruction accordingly. In some implementations, this may mean authorizing and implementing the transfer instruction irrespective of whether it results in a resource threshold event with regard to the user account. In some cases, it may mean denying or declining the transfer instruction because it would result in a resource threshold event; for example, if the user account is not permitted to go into an overdraft state or some similar state.

If an external resource system is determined to be available in operation 508, then the computing system may send a query to the external resource system in operation 512. The query may be a prescribed message type or format. The query may utilize an API published by the external resource system for submitting queries. The query is transmitted to the external resource system over one or more wired or wireless computer networks. The external resource system may then validate the query, for example by confirming that user credentials or other authorization data in the query are valid and correctly identify a resource account associated with the user. If the query is valid, then the external resource system may prepare and send a response providing, at least, a balance or quantity of resources available for transfer from the resource account. In some cases, the available quantity may be zero. In the example of an earned wages access service, the available amount may depend on data received from a payroll system regarding earned wages or hours or days worked by the user since a last payroll run. The external resource system may have locally stored data based on an end-of-day report previously received from the payroll system in some cases. In some cases, the external resource system may be configured to make real-time queries of the payroll system to obtain real-time data regarding the status of users' earned wages or hours.

In operation 514, the computing system compares the data from the response message, and in particular the quantity of resources available from the resource account on the external resource system, with data regarding the resource threshold event and, in particular, the amount by which the balance or quantity of resources in the user account will fall below the threshold level. On this basis, the computing system determines in operation 514 whether there are sufficient resources available from the external resource account to offset or prevent the resource threshold event. If not, then the system may process the transfer instruction in the normal course, i.e. by implementing or declining the instruction in operation 510 depending on how the system is configured to respond to resource threshold events.

If sufficient resources are available from the external resource system to prevent the resource threshold event, then in operation 516 the system determines whether user authorization is required to access the external resource account. In some cases, the user may have configured the computing system to enable access to the external resource account by providing the necessary user credentials or other authentication data to generate and transmit a valid request for access. In some cases, even if the computing system has the necessary user credentials, the system may be configured to still obtain real-time user confirmation that access is permitted in this situation. In some cases, various rules or conditions may be set for pre-authorization. That is, a condition may be set that user authorization is not required for transfers below a certain quantity. Or, a condition may be set that user authorization is required is the transfer instruction is from a particular entity or is of a particular type of transaction. Other conditions or rules may be configured to instruct the computing system as to when user authorization is required.

If user authorization is found to be required in operation 516, then the computing system generates and transmits an authorization query. The authorization query may be a message, notification, or other communication address to one or more user addresses. The authorization query may, for example, be an app notification, a text message, an email message, a social media message, an automated voice-response phone call, or any other such communication or communications. The authorization query is sent to a user device or devices and output or displayed on that device or devices. The query may provide details regarding the transfer instructions, the transferee, the transfer quantity, the user account balance, the available resources from the external resource account, and/or the quantity of external resources proposed to be transferred to the user account. In response, the user may confirm or decline the proposed transfer of external resources. The authorization query may include one or more selectable links or other interface options by which the user device may receive user input indicating either confirmation or rejection of the proposed transfer, and a response message may be generated and returned to the computing system with data regarding that user input.

In operation 520, the computing system determines whether the received response message indicates confirmation or rejection of the proposed transfer. If rejected, then the computing system does not attempt to obtain resources from the external resource system and processes the transfer instruction as per normal in operation 510. If confirmation is detected, then in operation 522 the computing system generates and transmits a request for transfer or re-allocation of resources from the external resource system. The transferred resources, once confirmed by the external resource system may then be credited to the user account, thereby offsetting any shortfall that would otherwise cause the resource threshold event.

When sending a re-allocation or transfer request to the external resource system, the computing system may calculate a requested amount of resources in some cases. That is, the computing system may determine the amount by which the user account will fall below the threshold level and generate a transfer request for a quantity of resources in that amount or some fixed or percentage buffer quantity above that amount. In some instances, the computing system may request all available resources from the external resource system irrespective of the size of the potential shortfall.

Having generated and sent the transfer request, the computing system may also authorize and implement the transfer instruction in operation 506.

It will be appreciated and understood that various of the example operations described with regard to the exemplary methods detailed above may be carried out substantially contemporaneously or in a different order from that presented without materially impacting the functioning of the method, and those variations are included herein.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A computing system for handling a transfer event, comprising:
   a processor;
   a communications module coupled to the processor; and
   a memory coupled to the processor, the memory storing processor-executable instructions that, when executed by the processor, cause the processor to:
   receive a transfer instruction regarding a user account, including a transfer quantity;
   determine from the transfer quantity and resources associated with the user account that the transfer instruction would result in a resource threshold event associated with the user account;
   determine an amount of resources sufficient to avoid the resource threshold event;
   transmit a query message to an external resource system using a user identifier associated with the user account, the query message regarding a resource availability level of a resource account associated with the user identifier;
   receive a response message from the external resource system providing the resource availability level of the resource account associated with the user identifier, the external resource system including one of a corporate payroll computing system, a third party payroll processing system, or an earned wage access service;

compare the amount of resources sufficient to avoid the resource threshold event to the resource availability level of the resource account; and based on the resource availability level being sufficient to avoid the resource threshold event,
send a transfer request to the external resource system to re-allocate a first quantity of resources from the resource account to the user account, the first quantity of resources being the amount of resources sufficient to avoid the resource threshold event, and
authorize and implement the transfer instruction.

2. The computing system of claim 1, wherein the transfer instruction is received from a real-time transfer rail system.

3. The computing system of claim 1, wherein the resource threshold event is a negative balance in the user account.

4. The computing system of claim 1, wherein the resource threshold event is a credit used level exceeding a maximum credit level.

5. The computing system of claim 1, wherein the instructions, when executed, are to cause the processor to determine that the transfer instruction would result in the resource threshold event based on the resources associated with the user account, deduction of the transfer quantity from the resources, and one or more scheduled events associated with the user account over a time window.

6. The computing system of claim 1, wherein the instructions, when executed, further cause the processor to determine that the user account includes a pre-authorization to move resources from the resource account prior to sending the transfer request.

7. The computing system of claim 1, wherein the instructions, when executed, further cause the processor to:
determine that authorization is required to access the resource account;
transmit an authorization query message to a user address associated with the user account;
receive, in reply to the authorization query message, an authorization approval response; and
send the transfer request based on receipt of the authorization approval response.

8. The computing system of claim 7, wherein the user address is one of a telephone number, an email address, an application installation identifier, or a social media handle.

9. The computing system of claim 1, wherein the instructions, when executed, are to cause the processor to authorize and implement the transfer instruction in response to determining that the resource availability is sufficient to avoid the resource threshold event by:
sending a transfer approval message to an external computing system that sent the transfer instruction; and
recording the transfer event in memory in association with the user account.

10. A computer-implemented method for handling a transfer event, comprising:
receiving a transfer instruction regarding a user account, including a transfer quantity;
determining from the transfer quantity and resources associated with the user account that the transfer instruction would result in a resource threshold event associated with the user account;
determining an amount of resources sufficient to avoid the resource threshold event;
transmitting a query message to an external resource system using a user identifier associated with the user account, the query message regarding a resource availability level of a resource account associated with the user identifier;
receiving a response message from the external resource system providing the resource availability level of the resource account associated with the user identifier, the external resource system including one of a corporate payroll computing system, a third party payroll processing system, or an earned wage access service;
comparing the amount of resources sufficient to avoid the resource threshold event to the resource availability level of the resource account; and
based on the resource availability level being sufficient to avoid the resource threshold event,
sending a transfer request to the external resource system to re-allocate a first quantity of resources from the resource account to the user account, the first quantity of resources being the amount of resources sufficient to avoid the resource threshold event, and
authorizing and implementing the transfer instruction.

11. The method of claim 10, wherein the transfer instruction is received from a real-time transfer rail system.

12. The method of claim 10, wherein the resource threshold event is a negative balance in the user account.

13. The method of claim 10, wherein the resource threshold event is a credit used level exceeding a maximum credit level.

14. The method of claim 10, wherein determining that the transfer instruction would result in the resource threshold event includes determining that the transfer instruction would result in the resource threshold event based on the resources associated with the user account, deduction of the transfer quantity from the resources, and one or more scheduled events associated with the user account over a time window.

15. The method of claim 10, further comprising determining, prior to sending the transfer request, that the user account includes a pre-authorization to move resources from the resource account.

16. The method of claim 10, further comprising:
determining that authorization is required to access the resource account;
transmitting an authorization query message to a user address associated with the user account;
receiving, in reply to the authorization query message, an authorization approval response; and
sending the transfer request based on receipt of the authorization approval response.

17. The method of claim 16, wherein the user address is one of a telephone number, an email address, an application installation identifier, or a social media handle.

18. The method of claim 10, wherein authorizing and implementing the transfer instruction in response to determining that the resource availability is sufficient to avoid the resource threshold event includes:
sending a transfer approval message to an external computing system that sent the transfer instruction; and
recording the transfer event in memory in association with the user account.

19. A non-transitory computer readable storage medium comprising processor-executable instructions which, when executed, configure a processor to:
receive a transfer instruction regarding a user account, including a transfer quantity;

determine from the transfer quantity and resources associated with the user account that the transfer instruction would result in a resource threshold event associated with the user account;

determine an amount of resources sufficient to avoid the resource threshold event;

transmit a query message to an external resource system using a user identifier associated with the user account, the query message regarding a resource availability level of a resource account associated with the user identifier;

receive a response message from the external resource system providing the resource availability level of the resource account associated with the user identifier, the external resource system including one of a corporate payroll computing system, a third party payroll processing system, or an earned wage access service;

compare the amount of resources sufficient to avoid the resource threshold event to the resource availability level of the resource account; and based on the resource availability level being sufficient to avoid the resource threshold event,
send a transfer request to the external resource system to re-allocate a first quantity of resources from the resource account to the user account, the first quantity of resources being the amount of resources sufficient to avoid the resource threshold event, and authorize and implement the transfer instruction.

20. The non-transitory computer readable storage medium of claim 19, wherein the transfer instruction is received from a real-time transfer rail system.

* * * * *